United States Patent [19]
Kubik

[11] Patent Number: 4,869,575
[45] Date of Patent: * Sep. 26, 1989

[54] HEADWEAR-MOUNTED PERISCOPIC DISPLAY DEVICE

[75] Inventor: James C. Kubik, Lincoln, Mass.

[73] Assignee: Iota Instrumentation Company, Lincoln, Mass.

[*] Notice: The portion of the term of this patent subsequent to Jun. 28, 2005 has been disclaimed.

[21] Appl. No.: 176,726

[22] Filed: Apr. 1, 1988

Related U.S. Application Data

[63] Continuation-in-part of Ser. No. 862,116, May 12, 1986, Pat. No. 4,753,514.

[51] Int. Cl.⁴ ............................................. G02B 27/10
[52] U.S. Cl. .................................................... 350/174
[58] Field of Search ............... 350/638, 618, 171, 173, 350/174, 287, 286, 445, 565, 566, 562; 356/251-255; 351/158

[56] References Cited

U.S. PATENT DOCUMENTS

| D. 195,365 | 6/1963 | Holt | 350/638 |
|---|---|---|---|
| 3,216,308 | 11/1965 | Northcutt | 356/251 |
| 3,229,580 | 1/1966 | Mitchell | 350/286 |
| 3,524,710 | 8/1970 | Rickert | 356/251 |
| 4,052,073 | 10/1977 | Miller | 273/148 R |
| 4,550,984 | 11/1985 | Reymond | 350/404 |
| 4,722,601 | 2/1988 | McFarlane | 350/174 |
| 4,753,514 | 6/1988 | Kubik | 350/174 |

FOREIGN PATENT DOCUMENTS

| 2205325 | 4/1973 | Fed. Rep. of Germany | 356/251 |
|---|---|---|---|
| 113913 | 7/1983 | Japan | 351/158 |
| 301672 | 12/1928 | United Kingdom | 350/286 |

*Primary Examiner*—Jon W. Henry
*Attorney, Agent, or Firm*—Wolf, Greenfield & Sacks

[57] ABSTRACT

A periscopic display device for close-up viewing of a display. The device includes means for generating a display, such as an LED, LCD, or ELD display, and periscopic means consisting of a body of optically clear material having a reflecting prism portion and a collimating lens portion. The prism portion includes a first planar surface positioned adjacent to the display and at least one optically aligned reflecting surface for transmitting a reflected image of the display. The collimating lens portion consists of a convex lens having a focal point at the display and is positioned to receive the reflected image for focusing the image at optical infinity. Preferably the body includes a mounting portion in which the display generating means is embedded. The display device is lightweight, waterproof, dustproof, and is easily mounted on the eyeglass frames, visor, or headband of the wearer.

9 Claims, 2 Drawing Sheets

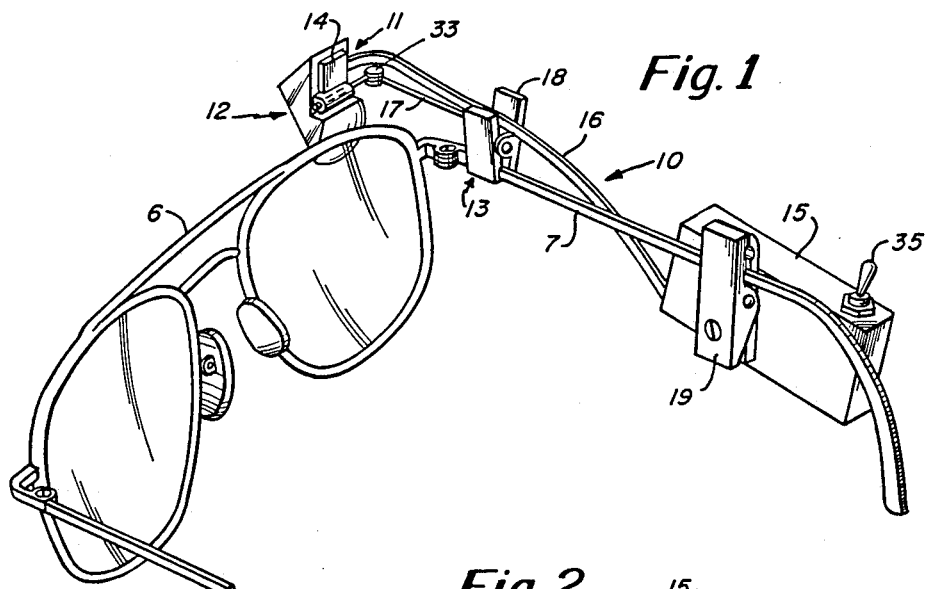
Fig. 1
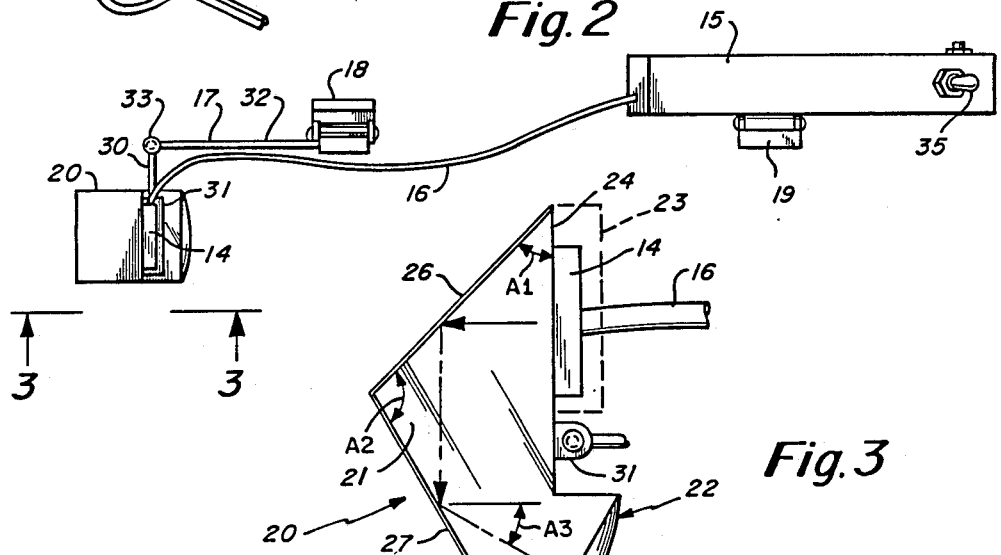
Fig. 2
Fig. 3
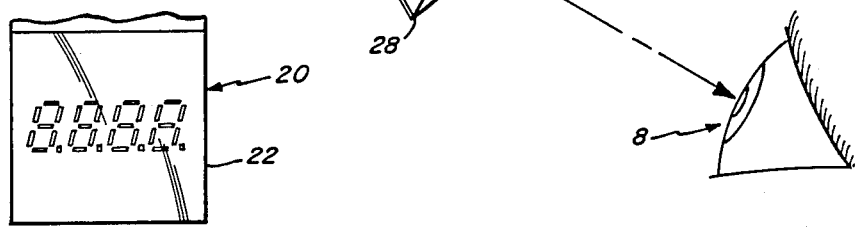
Fig. 4

HEADWEAR-MOUNTED PERISCOPIC DISPLAY DEVICE

RELATED APPLICATION

This a continuation-in-part of Ser. No. 06/862,116 filed May 12, 1986 by James C. Kubik entitled "Headwear Mounted Periscopic Display Device" now U.S. Pat. No. 4,753,514.

FIELD OF THE INVENTION

This invention relates to a headwear-mounted periscopic display device for close-up viewing of a display.

BACKGROUND OF THE INVENTION

Display devices for viewing an image of a display are described in U.S. Pat. No. 3,170,979 to Baldwin et al. and U.S. Pat. No. 3,059,519 to Stanton. These devices are complex and expensive and are intended for use by pilots and other professionals who need to have certain information continuously displayed within their line-of-sight.

The Baldwin et al. device superimposes an image from a cathode ray tube onto a half-silvered, see-through mirror positioned in the viewing field of the user so as to superimpose an image of the tube display on the normal background environment of the viewer. An elongated tube contains the cathode ray tube and a plurality of separate lenses which project the image onto a half-silvered surface and focus the image at optical infinity. The device is mounted on a harness worn over a helmet and measures about 1¼×5 inches and weighs less than six ounces.

The Stanton device includes a cathode ray tube and a plurality of lenses and mirrors. The Stanton device is mounted on the inside of a helmet and the image is displayed on a full reflecting mirror positioned at the lower edge of the helmet just above the pilot's eyes.

The Baldwin et al. and Stanton devices are complex optical systems including a plurality of separate lenses and mirrors which must be accurately positioned within the composite assembly. Each device is sufficiently large that it must be mounted on a helmet to provide sufficient stabilization and support. The price of these complex units can be justified when purchased for use by a pilot or other professional, but they are not intended for sale as a consumer item.

It has been suggested to provide a lap counter on a pair of swimming goggles in U.S. Pat. No. 4,530,105 to Rabinowitz. The counter includes a flux change detector which detects a change in direction of the earth's magnetic field when the swimmer changes direction, means for producing a pulse output during each such change in direction, circuit means for counting the pulses, and display means for displaying the number of laps completed, such as an LED or LCD display. An LCD display is shown mounted on one lens of the goggles with battery-operated circuitry for the display mounted on the headband of the goggles. Rabinowitz does not disclose an operative device because no means are described for focusing the display or rendering it waterproof. An LCD display device mounted on a pair of swimming goggles is too close to the viewer's eyes to be readable.

It is an object of this invention to provide a periscopic display device for close-up viewing of a display.

Other objects are to provide a periscopic display device which is lightweight, inexpensive to produce, waterproof, dustproof, impact-resistant, and adapted to be mounted on the headwear of the viewer.

SUMMARY OF THE INVENTION

A periscopic display device is provided for close-up viewing consisting of a display generating means and a unitary periscopic viewing means. The display generating means may be any type of electrooptical display device, e.g., light-emitting diode (LED), electroluminescent (ELD), or liquid crystal (LCD). The unitary periscopic viewing means consists of a body of optically clear material having a reflecting prism portion and a collimating lens portion. The prism portion includes a first planar surface positioned adjacent to the display and at least one optically aligned reflecting surface for transmitting a reflected image of the display. The collimating lens portion includes a convex lens having a focal point at the display which is positioned to receive the reflected image and focus the image at optical infinity. Preferably, the display generating means is mounted on the first planar surface. More preferably, the optically clear body includes a mounting portion in which the display generating means is embedded. In addition, means are provided for mounting the periscopic viewing means on headwear, such as eyeglass frames, a headband, the sunvisor of a cap, or other hat.

In a first preferred embodiment, the prism portion includes a pair of reflecting surfaces. For example, a first reflecting surface may be disposed at an angle of about 45° with respect to the first planar surface, and a second reflecting surface may be disposed at an angle of from about 103° to about 107°, and more preferably about 105°, with respect to the first reflecting surface. The body is made of a clear epoxy resin having a refractive index of about 1.5. The focal length of the collimating lens is about 0.9 to about 1.1 inches, more preferably, about 1.0 inch. This device permits a 0.04×0.250 inch display of 4 LED characters to be readily viewed when mounted in front of the eyeglasses of the wearer.

In another preferred embodiment, a single reflecting surface is utilized. The device is simpler, but less compact than the first embodiment.

Additional features of the invention, its nature and various advantages, will be better understood from the following detailed description of certain preferred embodiments.

BRIEF DESCRIPTION OF THE DRAWINGS

FIG. 1 is a perspective view of a first embodiment of the periscopic display device of this invention mounted on a pair of eyeglass frames.

FIG. 2 is a top elevational view of the periscopic display device of FIG. 1.

FIG. 3 is a schematic diagram of the periscopic viewing means of FIG. 1 positioned with respect to the viewer's eyeball.

FIG. 4 is a schematic diagram of a four character LED display viewed from the collimating lens portion of the device of FIG. 1.

DETAILED DESCRIPTION OF THE PREFERRED EMBODIMENTS

Figure 6:
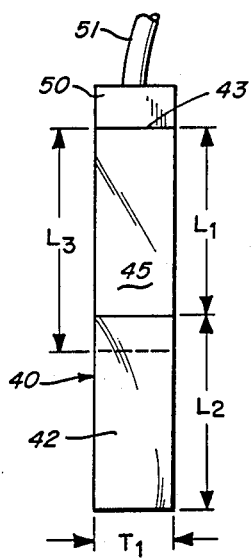
FIG. 6 is a front elevational view of the periscopic viewing means of FIG. 5.

A first preferred embodiment of this invention is the periscopic display device 10 shown in FIGS. 1-4. The device 10 is mounted on a pair of eyeglass frames 6, and includes a display generating means 11, a periscopic viewing means 12, and mounting means 13. The periscopic viewing means 12 is mounted in front of the upper right corner of the right eyeglass lens within the peripheral view of the user. The display generating means 11 includes a display screen 14 mounted on the periscopic viewing means, a light-weight metal or plastic housing 15 containing electronic circuit means for generating the display, and connecting means 16 for operatively connecting the electronic circuit to the display screen. The mounting means 13 includes an arm 17 connected at one end to the periscopic viewing means and at the other end to a clip 18 attached to a side arm 7 of the eyeglass frames. A second clip 19 connects the housing 15 to side 7 of the eyeglass frames.

By way of example, the display may comprise four LED characters, as shown in FIG. 4, which are programmed to function as a count-down timer. The two left hand characters can be programmed to display the minutes and the two right hand characters, the seconds. Such a timer would be useful to a sailboat racer for keeping track of the time remaining until the start of the race. By setting the counter at 5:00 when the five-minute warning is given, the sailboat operator has within his field of view while he moves about the boat a continuous display of the time remaining until the start of the race. Because the device is waterproof, it is particularly desirable for this use.

The display generating means 11 described in this embodiment is a light emitting diode (LED) display. However, other means for displaying visual information can be used.

The display screen 14 shown in the drawings consists of four seven-segment LED characters or chips mounted in a chip carrier. Each character has a height of 0.040 inch and is disposed in a die which is $0.048 \times 0.036$ inch. The four chips are mounted in an eighteen lead memory chip carrier which is $0.35 \times 0.29$ inches. Connecting means 16 is a flexible ribbon cable or other conducting means which connects the leads from the chip carrier to the circuit means for operating the LED display.

The unitary periscopic viewing means 12 consists of a body 20 of optically clear material, such as clear epoxy resin or glass, having a refractive index of from about 1.45 to about 1.55, and preferably consists of a clear epoxy resin having a refractive index of about 1.5. A suitable resin is sold under the tradename ER 2400 (clear), by Formulated Resins, Inc., of Greenville, R.I. The optically clear body includes a reflecting prism portion 21, a collimating lens portion 22 and preferably a mounting portion 23 (shown in phantom in FIG. 3) in which the LED display is embedded.

The prism portion 21 includes a first planar surface 24 positioned parallel and adjacent to the display screen 14. In the preferred embodiment, the LED carrier with attached leads is embedded in a mounting portion 23 of the optically clear body 20. The prism portion further includes a plurality of optically aligned reflecting surfaces 26, 27 for transmitting a reflected image of the display. In this preferred embodiment, a first reflecting surface 26 is disposed at an angle A1 of about 45° with respect to the first planar surface 24, and a second reflecting surface 27 is positioned at an angle A2 of from about 103° to about 107° with respect to the first reflecting surface, and more preferably about 105°. The reflecting surfaces 26, 27 are preferably mirrored, such as by applying a vacuum-deposited metallic coating thereon, to reduce light loss therethrough. The mirrored surfaces further enhance contrast by permitting less ambient light to enter the body. However, the device will function even if the reflecting surfaces are not mirrored.

The collimating lens portion 22 of the body comprises a spherical convex lens. The focal point of the lens is at the LED display screen 14 and the lens receives the reflected image from the second reflecting surface 27 and focuses the image at optical infinity. The collimating lens magnifies the LED display to enable the viewer to read the display without difficulty.

In the preferred embodiment shown, the body 20 is 0.5 inches wide $\times$ 0.9 inches high, the first planar surface 24 is 0.5 wide $\times$ 0.4 inches high, the first reflecting surface 26 is 0.5 inches in length, the second reflecting surface 27 is 0.7 inches in length, the first reflecting angle A1 is 45°, and the second reflecting angle A2 is 105°. With the body vertically aligned so that the first planar surface 24 lies in a vertical plane, as shown in FIG. 3, the light rays exit from the collimating lens 22 at an angle A3 of 30° below horizontal. If the bottom edge 28 of the collimating lens is positioned about 0.75 inches above the top of the eyeball 8, the display is easily read by the viewer while looking slightly above the line of sight of his normal gaze.

Mounting means are provided for mounting the composite periscopic viewing means 12 and display screen 14 on the user's headwear. Because the display viewing means and screen are very light, weighing no more than about two ounces, it can be readily mounted on a pair of eyeglass frames. The mounting means includes a metal arm 17 having a first arm portion 30 disposed horizontally and attached by adhesive 31 to the body 20 between the display screen 14 and collimating lens 22, a second arm portion 32 pivotally connected and extending at right angles to the first arm portion via a pivotal connecting means 33, and a metal clip 18 disposed at the opposite end of second arm portion 17 for releasably attaching the device to arm 7 of the eyeglass frames, visor, headband or the like. Other mounting means may be provided for mounting the body and display screen on eyeglasses, a visor, or any other type of headgear worn by the viewer.

Additional mounting means include a clip 19 for releasably attaching the housing 15 to the eyeglass arm 7. Other means may be used for mounting the housing on the user s eyeglass frames, hat brim, neck pendant, or belt, or the housing may be carried by hand.

The display screen 1 is operatively connected via connecting means 16 to circuit means contained in housing 15. The circuit means preferably includes a microprocessor for programming the display device to function as a count-down timer or a count-up timer, to start counting at zero or a predetermined number. The circuit means may be powered by a battery contained in the housing. A multi-position toggle switch 35 is provided for starting, stopping, and resetting the counter.

By way of example, an ICM7217 microprocessor sold by Intersil, Inc. of Cupertino, Calif. will operate as the count-down timer to drive a four character display of 7 segment LED chips, such as the MMH62 LED chips sold by General Instrument Optoelectronic Div., Palo Alto, Calif., with the power supplied by a 20 mil. coin/wafer lithium battery.

One of the principal benefits of the display device of this invention is the minimal power required for viewing the LED display. Because the display can be focused such a short distance from the eye, e.g., within one inch of the eye, the energy required to power the LED display is minimized. Further, the close up viewing enhances the contrast between the LED display and bright backgrounds. Other methods for improving contrast by reducing incoming ambient light are to provide mirrored coatings on the reflecting surfaces and other exterior surfaces of the body and to position the device beneath a visor.

Although the described embodiment of the invention uses an LED display functioning as a count down timer, many other types of display functions can be provided with the apparatus of this invention. Other functions for the display include use as a clock to show a runner or other athlete the elapsed time, or to display the heartbeat rate of a patient.

Furthermore, the periscopic device may be used with any electro optical display device, including but not limited to light emitting diode (LED), liquid crystal (LCD), electroluminescent (ELD), vacuum fluorescent (VF), plasma, and cathode ray tube (CRT). For example, an LCD display uses much less power than an LED display. However, an LCD display is difficult to see under certain lighting conditions and is generally larger in size. For use with an LCD display, sufficient light must enter the body and reflect off the display to view the same. Perhaps the most preferred display, where cost is not a factor, is an ELD display which exhibits the best combined features of the LED (luminescence) and LCD (low power).

Figure 5:
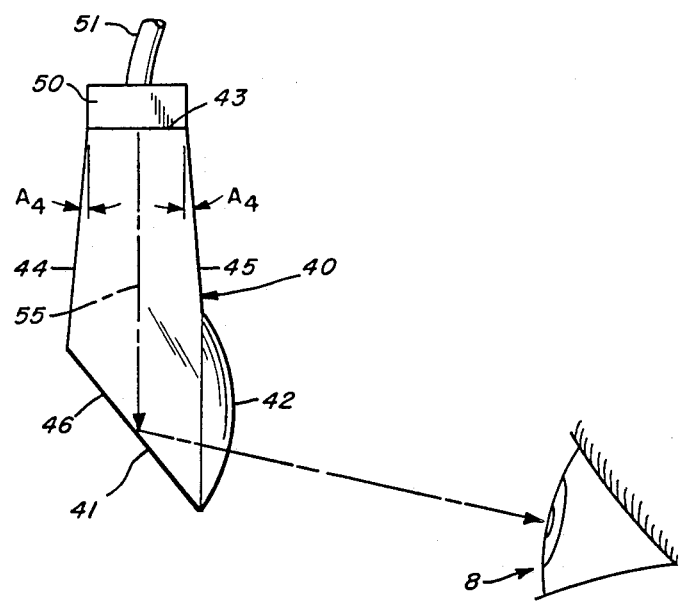
FIG. 5 is a schematic diagram of a second embodiment of a periscopic viewing means of this invention positioned with respect to the viewer's eyeball.

A second preferred embodiment of the invention is shown in FIGS. 5-6, wherein the periscopic viewing means 40 has only one reflecting surface 46. This device is simpler than the first embodiment, but less compact. The device may be mounted in front of the upper right corner of the right eyeglass lens within the viewer's line of sight, in a manner similar to that shown in FIG. 1. As shown in FIG. 5, the display generating means 50 is mounted horizontally on the top surface of the periscopic viewing means (as opposed to the front surface in the first embodiment). However, the device shown in FIG. 5 can be rotated 90° such that the display screen 50 is disposed vertically on the body.

The unitary periscopic viewing means of the second embodiment consists of a body 40 of optically clear material. The material may be the same as that described in the first embodiment. However, the shape of body 40 differs from that of body 20. Body 40 has a reflecting prism portion 41 and a collimating lens portion 42. The prism portion 41 includes a first planar surface 43 horizontally disposed and positioned parallel and adjacent to a display screen 50. Screen 50 is connected by a cable 51 to a circuit for operating the display. Preferably, the screen 50 is embedded within a mounting portion (not shown) of the body 40 in a manner similar to that shown in FIG. 3.

The prism portion 41 includes a pair of opposing sidewalls 44, 45 which each flair outwardly from the vertical centerline by an angle $A_4$ of 5°. Prism portion 41 also includes a reflecting surface 46 extending from the distal end of sidewall 44 and disposed at an angle of about 45° from the vertical centerline (same as the vertical portion of optical path 55). Disposed at the lower end of reflecting surface 46 is a substantially vertically disposed collimating lens 42 having a ½ inch radius spherical surface. The terminating chord of lens 42 (wherein the lens joins the prism portion) has a length $L_2$ of 9/16 inch. The length $L_1$ of sidewall 45 is ⅜ inch. The length L3 of sidewall 44 is ¾ inch. The length of reflecting surface 41 is ⅜ inch. The thickness $T_1$ of the body 40 is ¼ inch. Preferably, each of surfaces 44, 45, and 46 are mirrored to reduce light loss and enhance contrast by precluding ambient light from entering the body. The focal point of lens 42 is at the display screen 50 and the lens receives a reflected image from reflecting surface 46 and focuses the image at optical infinity. The collimating lens magnifies the display to enable the viewer to read the display without difficulty. The display is easily read by the viewer while looking slightly above the line of sight of his normal gaze. Preferably, the lens 42 has a focal length of from about ¾ to about 1¾ inch.

Having described certain preferred embodiments of the invention in detail, those skilled in the art will appreciate that numerous modifications may be made thereof without departing from the spirit of the invention. Therefore, it is not intended that the scope of the invention be limited to the specific embodiments described, but rather it is intended that the scope of the invention be determined by the appended claims and their equivalents.

What is claimed is:

1. A display device positionable on the eyeglass frames or other headwear of the user, said display device comprising:
   a display generating means;
   a body of optically clear material having a first surface,
   means for positioning the display generating means adjacent the first surface,
   said body having at least one optically-aligned reflecting surface for transmitting a reflected image of the display, and
   said body having a convex lens with a focal point at the display, said lens receiving the reflected image and focusing the image at optical infinity, wherein the display generating means and body are positionable on the eyeglass frames or other headwear of the user for positioning the assembly within the peripheral viewing field of the user to enable close-up viewing of the display.

2. The display device of claim 1, further comprising:
   means for mounting the assembly on the eyeglass frames or other headwear of the user.

3. The display device of claim 2, wherein
   the assembly is mounted on the eyeglass frames of the user and positioned in front of one lens of the eyeglass frames.

4. The display device of claim 1, wherein
   the outer surfaces of the body are mirrored to reduce light loss and prevent ambient light from entering the body.

5. The display device of claim 1, wherein
   the display generating means is an electro-optical display means.

6. The display device of claim 1, wherein
   the body further comprises a mounting portion in which the display generating means is embedded.

7. The display device of claim 1, wherein
   the body has one reflecting surface.

8. The display device of claim 1, wherein
   the body has two reflecting surfaces.

9. The display device of claim 1, wherein
   the convex lens has a focal length within the range of about ¾ to about 1¾ inch.

* * * * *

UNITED STATES PATENT AND TRADEMARK OFFICE
CERTIFICATE OF CORRECTION

PATENT NO. : 4,869,575
DATED : September 26, 1989
INVENTOR(S) : James C. Kubik

It is certified that error appears in the above-indentified patent and that said Letters Patent is hereby corrected as shown below:

Column 4, line 56, change "1" to --14--.

Signed and Sealed this

Nineteenth Day of April, 1994

Attest:

BRUCE LEHMAN

*Attesting Officer*     *Commissioner of Patents and Trademarks*